Dec. 30, 1958
H. CLASEN
2,866,487
POTATO PEELING MACHINES
Filed May 10, 1955
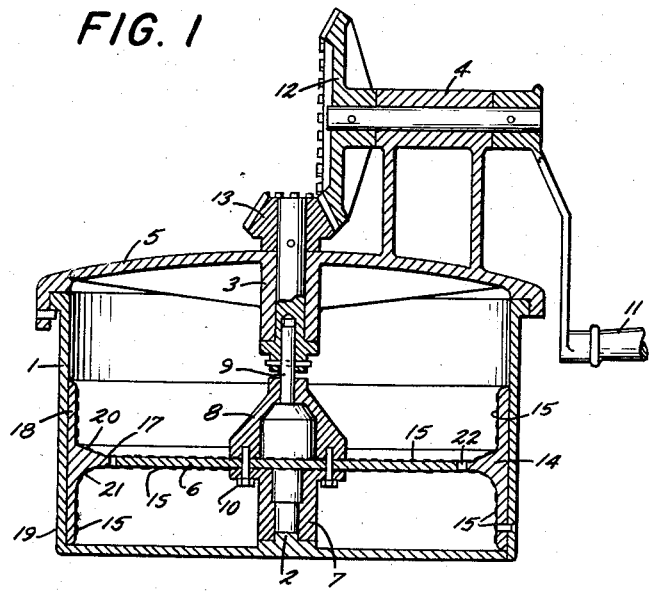
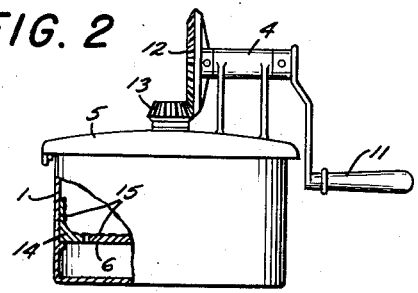
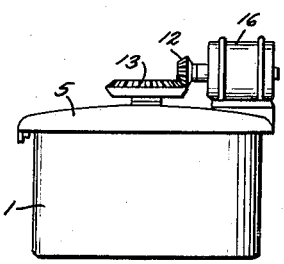
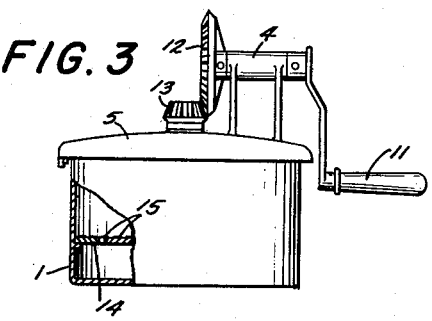
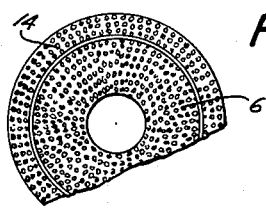
INVENTOR
HEINRICH CLASEN
BY
ATTORNEY United States Patent Office 2,866,487
Patented Dec. 30, 1958

2,866,487

POTATO PEELING MACHINES

Heinrich Clasen, Hamburg-Nienstedten, Germany

Application May 10, 1955, Serial No. 507,351

Public Law 619, August 23, 1954
Patent expires June 1, 1968

10 Claims. (Cl. 146—49)

The invention relates to a potato peeling machine of that type comprising a container and at the base of this receptacle a revolving disc covered with an abrasive material by means of which potatoes, vegetables, fruit and the like are peeled.

The object of the invention is to provide an improved machine of the type described, by means of which vegetables, especially potatoes may be thoroughly peeled in short time in an efficient manner, while assuring a careful treatment of the potatoes and obviating loss in waste.

Another object of my invention is to provide a potato peeling machine which is of a very simple construction and which may be produced at a comparatively low cost.

Referring to the drawing:

Fig. 1 is a vertical section view through the machine constructed in accordance with the invention.

Figs. 2 and 3 are side elevations partly in section of two other embodiments of the invention.

Fig. 4 is a side view of an embodiment incorporating power drive.

Figs. 5 and 6 show details of another form of construction of the peeling device of the apparatus.

Referring to Fig. 1:

On the bottom of a cylindrical container 1 a base bearing 2 has been arranged. The container 1 being open on top can be closed by a cover 5. The cover carries a vertical bearing 3 and a horizontal bearing 4. In the container 1 a plain disc 6 is arranged. The two surfaces of the disc 6 are provided with a layer of abrasive material 15 of known kind. This grinding substance can be for instance silicon carbide. The disc 6 is fixed by set screws 10 between body 7 and body 8. Body 7 is a bearing body in form of a socket and is turnably arranged on the base bearing 2. The bearing body 8 is bell-shaped and provided with a spindle 9. The spindle 9 is releasably connected to a coaxial shaft of a bevel gear 13 mounted on the cover bearing 3 so that the cover 5 can be lifted off upwards, thus making the interior of container 1 accessible for putting the potatoes thereinto. In the horizontal bearing 4 a bevel gear 12, is turnably arranged. This bevel 12 is geared together with bevel 13. By turning the hand crank 11, the disc 6 in the interior of the container is revolved.

The driving by hand, as shown in Fig. 1, instead of from above can also be arranged from below, thus leaving free the space above the disc 6.

Instead of a driving by hand any other mechanical driving above or below the disc can be provided for.

At the inner wall of the container 1 a peeling device 14, also covered by a grinding substance 15, has been fixed. This peeling device consists of a ring 17 in form of a plate and a pair of flanges 18, 19, which project substantially normal to the disc 6 from the outer periphery of ring 17 respectively in opposite directions. The outer part of the upper surface of the ring 17 is slightly inclined towards the flange 18, as is shown with 20, in such a way that the surface of the disc 6 and the ring practically represent an even bottom-plane. A modification is shown with 21 (Fig. 1), in this case the outer part of the ring 17 is formed as a slightly curved surface. The inclined outer parts 20 and 21 of the ring 17 are provided in order to raise the efficiency of the ring 17 as stopping device for the potatoes being moved outwards by the rotating disc 6. The ring 17 has been fixed at the wall of the container 1 by means of flanges 18 and 19 and what is more, in a way that the revolving disc 6 and the ring are separated from each other only by a narrow annular gap 22.

Consequently the peeling machinery has a stationary ring-shaped peeling device 14 and a peeling device 6 revolving in the ring 17 of the peeling device. The revolving peeling device 6 and the ring-shaped part 17 of the stationary peeling-device 14 are practically forming an even plane, which at the same time is the bottom of the peeling machine.

The revolving disc 6 can be covered with grinding substance on both sides.

Since the grinding device 14 has two flanges 18, 19 each of which being provided with grinding substance it may be turned in case the grinding substance is worn away on one surface, so that the grinding device 14 with its unused grinding substance can be utilized. The same applies to the revolving disc 6, being provided with grinding substance on both sides.

In operation of my improved potato peeling machine the potatoes are filled into the container 1 and after having replaced the cover 5 the disc 6 is rapidly revolved by turning the hand crank 11. By the centrifugal force the potatoes are being moved outwards from the disc 6 on the ring 17 of the peeling device 14. When the potatoes are getting on the ring 17 they are stopped in their outward movement by the stationary ring, whilst at the same time they are rolled around in all directions by the continually revolving disc 6. In course of this movement the external peel of the potatoes is ground off by the two peeling devices 6 and 14. The ring 17 of the peeling device 14 is so wide that the potatoes to be peeled are safely kept by it or, with other words, that their outward movement is stopped while they are getting into a rolling movement by the revolving disc 6. For this reason the revolving disc 6 and part 17 of the peeling device are constructed as to substantially form an even plane.

Referring to Fig. 2:

This modification is differing from that shown by Fig. 1 in such a way that the cross section of the stationary peeling device 14 has been arranged in form of an angle and is loosely and removably mounted within the container 1. The angle-ring formed in this way is of course secured against any distortion. The surface of the angle-ring is naturally also provided with a grinding substance 15 of known kind.

Referring to Fig. 3:

This modification is only differing from the two aforesaid described examples in such a way that the stationary peeling device 14 is consisting of a flat ring to be put into the container 1 and secured against distortion, without any flanges.

The grinding substance of the revolving disc 6 and the stationary peeling device can either be of the same nature or of a different kind, which ever may be the requirements of the fruits to be peeled, considering that the machine is not only provided for the peeling of potatoes but also for peeling other fruits.

Referring to Fig. 4:

Same is only differing from the three aforesaid described examples, that the drive by hand crank of the turnable disc 6 has been replaced by power, for instance an electromotor. It will not be necessary to give further particulars, this drive in itself being perfectly known.

The example as shown by Figs. 5 and 6 compared with the embodiments of the invention according to Figs. 1 to 3 is only differing in such a way that instead of the peeling devices 6 and 14 covered with grinding substance, a kind of grater, as serving for instance for grating potatoes, has been used.

Fig. 6 is a partial top view showing the revolving part of the bottom 6 and the stationary part of the bottom 14. Thereby the part of the bottom 6 has been formed as an even circular disc and the stationary part 14 can show the same cross sections as the ring 14 in the modifications shown by Figs. 1 to 3. Fig. 5 is illustrating on a larger scale in a transverse section the appearance of the surfaces of the peeling devices of this form of execution.

The provided peeling machine is not only suitable for peeling potatoes or similar tuberous plants, but amongst others also for cleaning gooseberries, and in general for treatment of surfaces, i. e. grinding, polishing etc. of other bodies.

What I claim is:

1. A peeling apparatus, comprising, in combination, receptacle means having upstanding wall means; annular shelf means attached to said receptacle means and having a substantially horizontal and substantially flat rough upper surface arranged within said receptacle means adjacent said wall means thereof and substantially normal thereto and extending inwardly into the interior of said receptacle means; a circular turntable having an outside diameter corresponding substantially to the inner diameter of said shelf means, said turntable having a substantially horizontal and substantially flat rough upper surface, being mounted in said receptacle means for rotation about an upright axis, and being encompassed by said shelf means with said rough upper surface of said turntable being substantially flush with said rough upper surface of said shelf means; and means for rotating said turntable about its axis.

2. A peeling apparatus comprising, in combination, tubular receptacle means having endless upstanding wall means; annular shelf means removably mounted in said receptacle means and having a substantially horizontal and substantially flat rough upper surface arranged within said receptacle means adjacent said wall means thereof and substantially normal thereto and extending inwardly into the interior of said receptacle means; a circular turntable having an outside diameter corresponding substantially to the inner diameter of said shelf means, said turntable having a substantially horizontal and substantially flat rough upper surface, being mounted in said receptacle means for rotation about an upright axis, and being encompassed by said shelf means with said rough upper surface of said turntable being substantially flush with said rough upper surface of said shelf means; and means for rotating said turntable about its axis.

3. A peeler apparatus as defined in claim 2 wherein said shelf means is constituted by the stem portion of an annular member of substantially T-shaped cross-sectional configuration arranged within said receptacle means, the outer peripheral surface of the bar portion of said member being in face-to-face engagement with the inner surface of said tubular wall means of said receptacle means.

4. A peeler apparatus as defined in claim 2 wherein said shelf means is constituted by one of the leg portions of an annular member of substantially L-shaped cross-sectional configuration arranged within said receptacle means, the outer peripheral surface of the other leg portion of said member being in face-to-face engagement with the inner surface of said tubular wall means of said receptacle means.

5. A peeler apparatus as defined in claim 2 wherein said shelf means is constituted by one of the leg portions of an annular member of substantially L-shaped cross-sectional configuration arranged within said receptacle means, the outer peripheral surface of the other leg portion of said member being in face-to-face engagement with the inner surface of said tubular wall means of said receptacle means, and wherein said wall means of said receptacle means is formed with shoulder means for removably supporting said annular member.

6. A peeler apparatus as defined in claim 2 wherein said shelf means is constituted by a flat annular member, and wherein said wall means of said receptacle means is formed with shoulder means for removably supporting said annular member.

7. A peeler apparatus as defined in claim 2 wherein the upper rough surfaces of said shelf means and said turntable are constituted by a layer of abrasive material.

8. A peeler apparatus as defined in claim 2 wherein said shelf means and said turntable are formed at their upper surfaces with grater means constituting said rough surfaces.

9. A peeler apparatus comprising, in combination, receptacle means having upstanding wall means; annular shelf means attached to said receptacle means and having a substantially horizontal and substantially flat rough upper surface arranged within said receptacle means adjacent said wall means thereof and substantially normal thereto and extending inwardly into the interior of said receptacle means; a circular turntable having an outside diameter corresponding substantially to the inner diameter of said shelf means, said turntable having a substantially horizontal and substantially flat rough upper surface, being mounted in said receptacle means for rotation about an upright axis, and being encompassed by said shelf means with said rough upper surface of said turntable being substantially flush with said rough upper surface of said shelf means; and means for manually rotating said turntable about its axis.

10. A peeling apparatus comprising, in combination, receptacle means having upstanding wall means; annular shelf means attached to said receptacle means and having a substantially horizontal and substantially flat rough upper surface arranged within said receptacle means adjacent said wall means thereof and substantially normal thereto and extending inwardly into the interior of said receptacle means; a circular turntable having an outside diameter corresponding substantially to the inner diameter of said shelf means, said turntable having a substantially horizontal and substantially flat rough upper surface, being mounted in said receptacle means for rotation about an upright axis, and being encompassed by said shelf means with said rough upper surface of said turntable being substantially flush with said rough upper surface of said shelf means; and motor means for rotating said turntable about its axis.

References Cited in the file of this patent

UNITED STATES PATENTS

| 856,037 | Delpire | June 4, 1907 |

FOREIGN PATENTS

| 586 | Great Britain | 1913 |
| 393,447 | Germany | Apr. 3, 1924 |
| 280,333 | Great Britain | Nov. 17, 1927 |